(12) United States Patent
Sheng et al.

(10) Patent No.: US 11,373,020 B2
(45) Date of Patent: Jun. 28, 2022

(54) METHOD AND SYSTEM WITH MESH DATA CONVERSION FOR STAMPING DIES

(71) Applicant: GM GLOBAL TECHNOLOGY OPERATIONS LLC, Detroit, MI (US)

(72) Inventors: Ziqiang Sheng, Troy, MI (US); Jounqmin Norman Goan, Troy, MI (US); Adam R. Groseclose, Sterling Heights, MI (US); Kleber Cabral, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 387 days.

(21) Appl. No.: 16/524,412

(22) Filed: Jul. 29, 2019

(65) Prior Publication Data

US 2021/0034711 A1    Feb. 4, 2021

(51) Int. Cl.
*G06F 30/20* (2020.01)
*G06F 111/10* (2020.01)
*G06F 119/18* (2020.01)

(52) U.S. Cl.
CPC .......... *G06F 30/20* (2020.01); *G06F 2111/10* (2020.01); *G06F 2119/18* (2020.01)

(58) Field of Classification Search
CPC ... G06F 30/20; G06F 2119/18; G06F 2111/10
USPC .......................................................... 703/1
See application file for complete search history.

(56) References Cited

U.S. PATENT DOCUMENTS

| 9,342,070 B2 | 5/2016 | Kubli et al. | |
| 2001/0050690 A1* | 12/2001 | Giles | G06T 11/60 |
| | | | 345/636 |
| 2017/0140573 A1* | 5/2017 | Woo | G06T 1/60 |

FOREIGN PATENT DOCUMENTS

WO   WO-2019112546 A1 *   6/2019   ........... B29C 64/386

OTHER PUBLICATIONS

OpenForm_2011 (The Industrial Solution for Sheet Metal Forming Simulation, OpenForm: gns—Gesellschaft Fur Numerische Simulation mbH, Apr. 17, 2011) (Year: 2011).*
Lind_2018 (Industrial Sheet Metal Forming Simulation with Elastic Dies, Master of Science in Mechanical Engineering Jun. 7, 2018 (Year: 2018).*
Zachen_2019 (Extraction of tool reaction forces using LS-DYNA and its use in Autoform sheet metal forming simulation, Master of Science in Mechanical Engineering Feb. 2019) (Year: 2019).*
SimTech. (1999). Introduction To Sheet Metal Forming Process. SimTech Simulation et Technologie. (pp. 13-47).

* cited by examiner

*Primary Examiner* — Brian S Cook
(74) *Attorney, Agent, or Firm* — Lorenz & Kopf LLP

(57) ABSTRACT

Systems and methods are provided for developing and producing a die using mesh data. A mesh data file representing a surface of the die is created. The mesh data file is configured in an original format that is one of a point-facet format or a node-element format. The mesh data file is translated into a translated format that is another of the point-facet format or the node-element format. Prior to building, the die, as represented by the mesh data file, is evaluated virtually.

14 Claims, 8 Drawing Sheets

METHOD AND SYSTEM WITH MESH DATA CONVERSION FOR STAMPING DIES

TECHNICAL FIELD

The present disclosure generally relates to the conversion of mesh data for use in multiple die development applications, and more particularly relates to the conversion of mesh data between different formats to enable using a same geometric representation in different development activity soft tools.

BACKGROUND

Stamping sheet metal involves the development of dies that include mating halves that when brought together by a press form a blank into a desired shape. One or multiple stamping stations may be used to process the blank through stages that result in the final design shape for the part. The die halves include die faces with profiles that contact the blank and effect the forming operations. The die faces are defined by three-dimension math data during the development process, which is used to construct the die.

Prior to die construction, it is desirable to conduct analysis, such as by metal forming simulation using finite element modelling (FEM) approaches, on the dies to determine whether forming will be successful and to avoid the need to make modifications to hard tooling after it is built. To efficiently conduct the analysis, mesh data may be created for the part and/or the die faces. A mesh data model may be made of a lattice like virtual structure that uses geometric representation to define surfaces of a three-dimensional shape. The mesh data model has a greatly reduced number of elements so that calculations in the desired analysis are reduced when compared to a solid three-dimensional representation. The reduced data results in greater computational efficiency. It is desirable to carry out various analysis in more than one software application to evaluate and simulate die aspects. However, the mesh data created in one application is often not compatible with the file format used in another application. This leads to the need to create a unique mesh data model for use in each individual development application tool.

Accordingly, it is desirable to provide methods for efficiently and effectively developing dies, such as for sheet metal forming, using a common mesh data set with a same geometric representation in various modelling and analysis applications. Furthermore, other desirable features and characteristics of the present invention will become apparent from the subsequent detailed description and the appended claims, taken in conjunction with the accompanying drawings and the foregoing technical field and background.

SUMMARY

In various embodiments, a method includes creating, by a computer apparatus, a mesh data file representing a surface of the die. The mesh data file is configured in an original format that is one of a point-facet format or a node-element format. The mesh data file is translated into a translated format that is another of the point-facet format or the node-element format. Prior to building, the die, as represented by the mesh data file, is evaluated virtually.

In another embodiment, prior to the translating, the computer apparatus is used to evaluate whether the mesh data file is in a correct format.

In another embodiment, the translating comprises calculating $\vec{u}=\vec{v}_1 \times \vec{v}_2$, where: $\vec{u}$ is a calculated normal vector value of a first point/node of the facet/element; $\vec{v}_1$ is a vector value from the first point/node to a second point/node of the facet/element; and $\vec{v}_2$ is the vector value from the first point/node to the third point/node.

In another embodiment, the translating comprises determining whether $\vec{u}=\vec{U}$, where $\vec{U}$ is a normal of the first point $\vec{U}$ from the mesh data file in the original format.

In another embodiment, one point/node is swapped for another point/node, when the determination finds that $\vec{u}$ is not equal to $\vec{U}$.

In another embodiment, after the translating, the mesh data file is cleaned by removing certain of the facet/element according to predetermined criteria.

In another embodiment, the predetermined criteria comprise those of the facet/element that fall below a threshold size.

In another embodiment, the cleaning comprises merging points/nodes that are within a threshold distance of each other.

In another embodiment, the evaluating comprises simulating operation of the die, by the computer apparatus running a first software application with the mesh data file in point-facet format. The surface of the die also evaluated by the computer apparatus running a second software application with the mesh data file in node-element format.

In another embodiment, the evaluating comprises virtually determining whether operation of the die as represented by the mesh data file results in malformation of a simulated blank material.

In a number of additional embodiments, a system includes at least one computer apparatus configured to create a mesh data file representing a surface of a product wherein the mesh data file is configured in an original format that is one of a point-facet format or a node-element format. The mesh data file is translated into a translated format that is another of the point-facet format or the node-element format. The product as represented by the mesh data file, is evaluated prior to building the product.

In another embodiment, the computer apparatus is configured to evaluate whether the mesh data file is in a correct format.

In another embodiment, the computer apparatus is configured to calculate $\vec{u}=\vec{v}_1 \times \vec{v}_2$, where: $\vec{u}$ is a calculated normal vector value of a first point/node of the facet/element; $\vec{v}_1$ is a vector value from the first point/node to a second point/node of the facet/element; and $\vec{v}_2$ is the vector value from the first point/node to the third point/node.

In another embodiment, the computer apparatus is configured to determine whether $\vec{u}=\vec{U}$, where $\vec{U}$ is a normal of the first point $\vec{U}$ from the mesh data file in the original format.

In another embodiment, the computer apparatus is configured to swap one point/node for another point/node, when the determination finds that $\vec{u}$ is not equal to $\vec{U}$.

In another embodiment, the computer apparatus is configured to clean the mesh data file by removing certain of the facet/element according to predetermined criteria.

In another embodiment, the computer apparatus is configured to convert each quad-element having four nodes in the mesh data file into two tri-elements each having three nodes.

In another embodiment, the computer apparatus is configured to merge points/nodes that are within a threshold distance of each other.

In another embodiment, the product comprises a die for stamping, and the computer apparatus is configured to: simulate operation of the die while running a first software application with the mesh data file in point-facet format; and evaluate a surface of the die while running a second software application with the mesh data file in node-element format.

In a number of additional embodiments, a method is provided for producing a die for stamping a blank into part. A computer apparatus is used to create a mesh data file representing a surface of the die, wherein the mesh data file is configured in an original format that is one of a point-facet format or a node-element format. The mesh data file is translated into a translated format that is another of the point-facet format or the node-element format. The die, as represented by the mesh data file, is evaluated prior to building the die. A die machining apparatus is used to build the die using the mesh data file.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
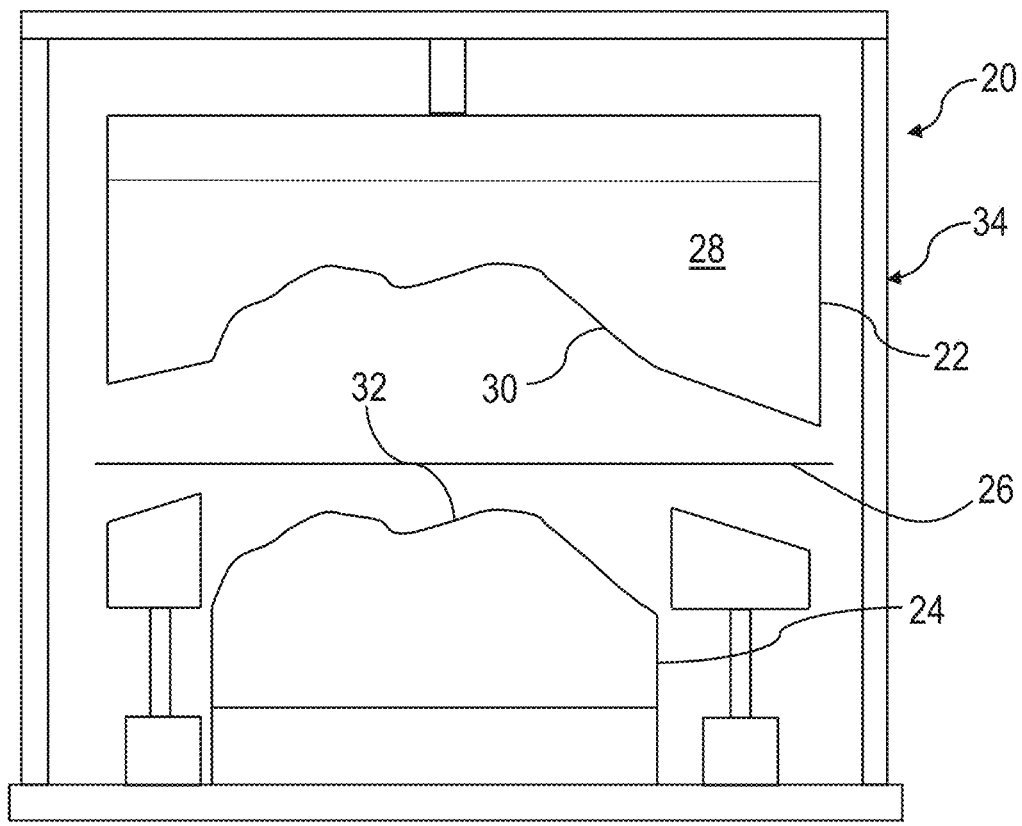
FIG. 1 is a schematic illustration of a stamping operation, in accordance with exemplary embodiments.

The following detailed description is merely exemplary in nature and is not intended to limit the application and uses. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification may be referred to as "modules" in order to more particularly emphasize their implementation independence. For example, functionality referred to herein as a module may be implemented wholly, or partially, as a hardware circuit comprising discrete components. A module may also be implemented in programmable hardware devices, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

The current description relates to examples of methods and systems that employ steps and activities some of which may be carried out by computers employing discreet rules and calculations. These activities are integrated into practical applications including in the manufacture of physical articles such as dies and stamped parts meeting sophisticated criteria. The practical applications of the current disclosure include elements that implement or use computer and/or mental activities in conjunction with particular and integral machines and manufactured articles. The specific machines employed, and the beneficial results achieved, are tangible and physical. The disclosed activities have practical utility and solve technological challenges. For example, using a common set of mesh data in multiple application software tools speeds development of dies and stamping operations. Also for example, the dies that are produced require fewer hardware modifications and produce higher quality parts.

As disclosed herein, methods of producing stamping dies include conducting metal forming simulation to identify and correct issues prior to finalizing the die design. The simulations may be carried out using mesh data models in more than one software tool. Creating mesh data of sheet metal components and die surfaces reduces the number of degrees of freedom in calculations and improve computational efficiency in conducting simulations. For example, LS-DYNA® which is a registered trademark of Livermore Software Technology Corporation may be used for various simulations such as in evaluating the die faces. Also for example, AUTOFORM®, which is a registered trademark of AutoForm Engineering GmbH, may be used to conduct simulations such as of forming a blank through various stages of die that may be used in the forming process. LS-DYNA® is capable of opening and using mesh data files in *.k and *.dyn extension format (referred to herein as node-element format). AUTOFORM® is capable of opening and using mesh data files in *.af extension format (referred to herein as point-facet format). As described herein, a mesh data file in node-element format may be converted to point-facet format and a mesh data file in point-facet format may be converted to node-element format. Accordingly, one common mesh data file may be used to conduct analysis, including simulations in both LS-DYNA® and AUTOFORM® regardless of which format was used to create the file.

With reference to FIG. 1, schematically illustrated is a stamping apparatus 20, which in general includes a die 28 with an upper die half 22 and a lower die half 24 each fixed in a press 34. The die halves 22, 24 have respective complementary die surfaces 30, 32 disposed to face each other. The upper die half 22 and the lower die half 24 are moveable relative to one another to compress a blank 26, made of a material such as sheet metal. The die surfaces 30, 32 are configured to change the form of the blank 26 changing its shape to reflect their profile. The die 28 may be one in a series of dies through which the blank is progressively processed to change the blank into the shape of the finished product. During the forming process issues may arise with the reformed blank 26. For example, undesirable stamping outcomes may include material wrinkles, splitting, folds, excessive thinning, inaccurate shape, springback and surface quality. Because the die 28 is a long lead time assembly, anticipating these issues speeds the process of initiating production stamping. To build the die, 3-D math data of the finished part to be produced is used to determine the profile of the surfaces 30, 32, which is also defined by 3-D math data. Simulation tools may be used to evaluate the die 28 as represented by mesh data files, prior to the die being built. This provides the ability to make correction in the virtual word, saving substantial time and expense.

Figure 2:
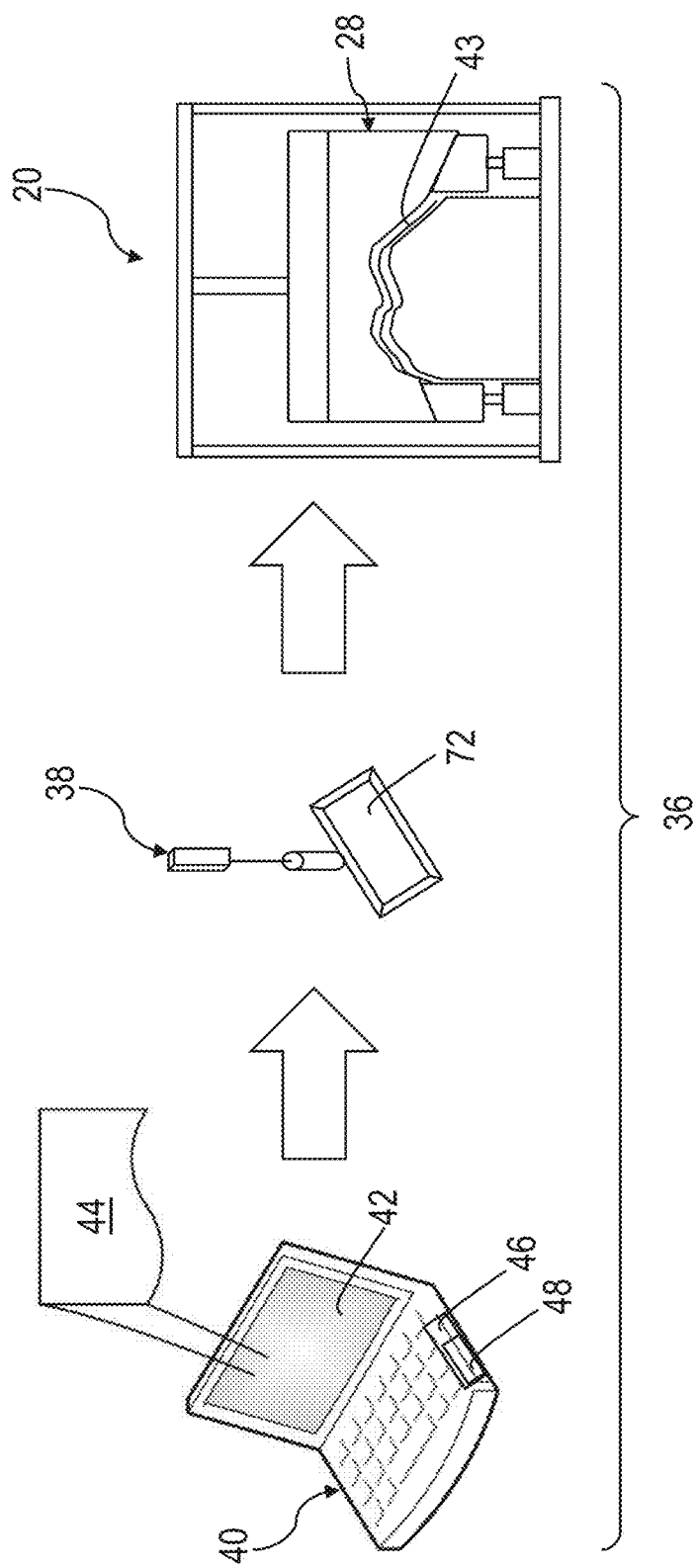
FIG. 2 is a diagram of a stamping die development system, in accordance with various embodiments.

Referring additionally to FIG. 2, a stamping system 36 in general, includes at least one computing device 40, die machining apparatus 38, and the stamping apparatus 20. Design and development activities may be carried out using the at least one computing device 40. The resulting data may be used in the die machining apparatus 38, such as a milling or other metal removal machine, to build the die 28, which in-turn may be used in the stamping apparatus 20 to produce a stamped part 43. The die 28 is designed, such as through computer aided design (CAD), using information on the part 43 to be produced. Prior to use of the machining apparatus 38 to build the die 28, simulations may be carried out using software applications running in the at least one computing device 40. The computing device 40 may be implemented by any computing device that includes at least one processor, some form of memory hardware, and some form of input and output hardware. For example, the computing device 40 may be implemented using a standalone computer system, a portable computing device, or a personal computing device (e.g., a tablet computer, a laptop computer, a personal digital assistant (PDA), a smartphone), or the like. For purposes of the present disclosure, the computing device 40 is capable of storing, maintaining, and executing instructions configured to evaluate aspects of stamping operations including dies using mesh data files. In addition, the computing device 40 includes display hardware such as a screen 42 for displaying visualizations 44, such as those of application pages, part surfaces and die surfaces.

Figure 3:
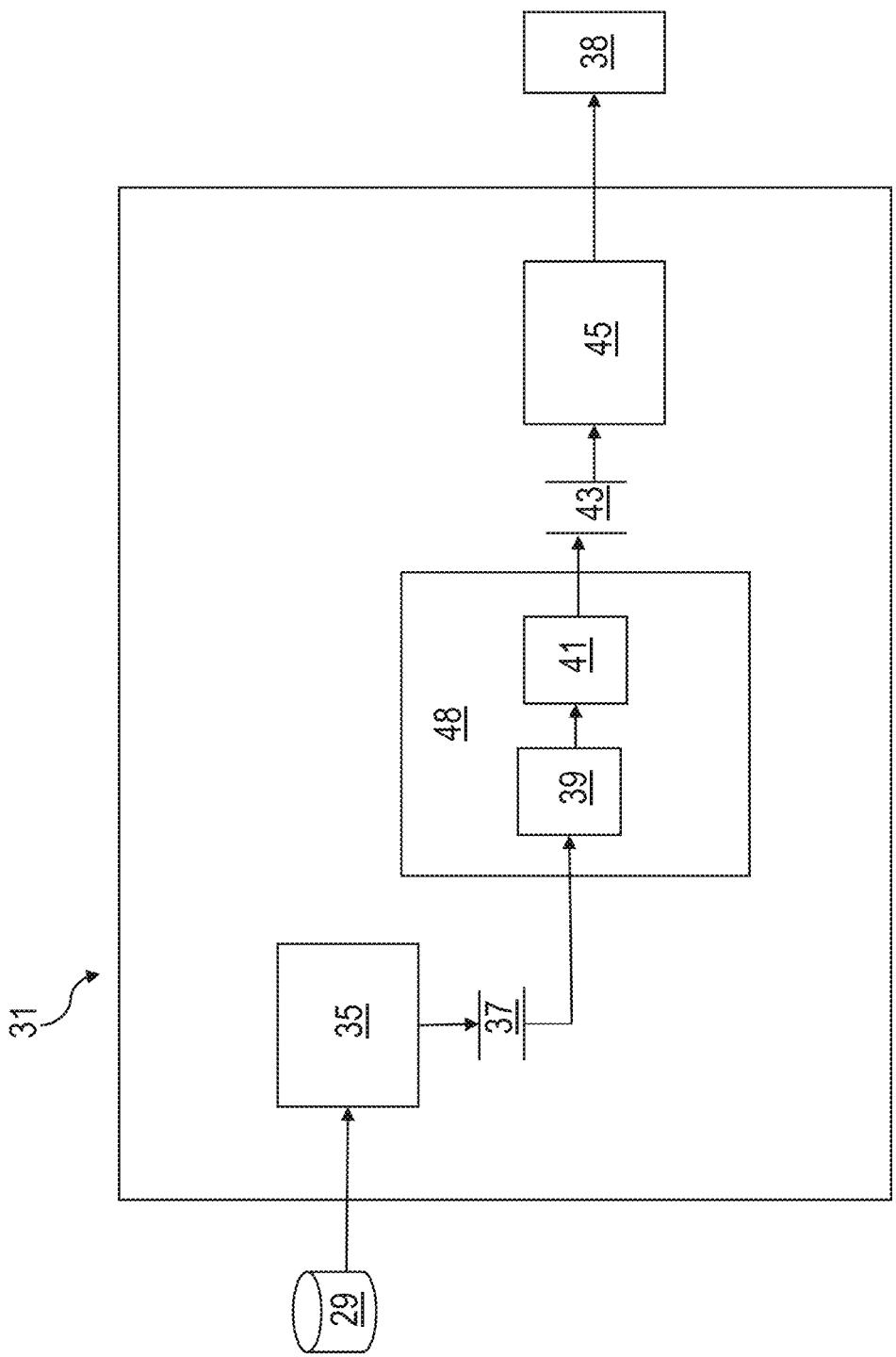
FIG. 3 is a dataflow diagram illustrating a creation and translation module of the stamping die development system, in accordance with exemplary embodiments.

Referring now to FIG. 3, a dataflow diagram illustrates various embodiments of a stamping preparation module 31 of the stamping system 36. Various embodiments of according to the present disclosure may include any number of sub-modules embedded within any number of computer apparatuses of the stamping system 36. As can be appreciated, the sub-modules shown in FIG. 3 may be combined and/or further partitioned to similarly create, translate and evaluate mesh data for the stamping system 36. Inputs to the system may be delivered via any means of data transfer 33 for the delivery of 3-D math data of the die 28 or of previously created mesh data such as from a datastore 29.

A mesh data creation module 35 receives the data transfer 33 and creates a mesh data model/file 37. The mesh data model 37 may be originally created in node-element format or in point-facet format. In either case, the mesh data model 37 includes shell components that greatly reduce the overall amount of data in the representation of the die 28. Shell components only mesh the exterior surfaces of the die's geometry. The number of nodes and elements or points and facets in the mathematical model is dramatically reduced because the volume of the die is not included.

The mesh data model 37 is transferred to the translation module 48 for translation from node-element format to point-facet format, or alternatively for translation from point-facet format to node-element format. The translation module 48 includes a translate submodule 39, where the mesh data is translated between point-facet and node-element format as further described below. The translation module 48 also includes a cleaning submodule 41. In general, the cleaning sub-module 41 further reduces the number of components of the mesh data model 37 by removing components according to predetermined criteria as further described below.

The translated mesh data model 37 is transmitted to an evaluation/simulation module 45 where the die surfaces are evaluated as further described herein. Changes may be made to the mesh data model 37 according to results of the evaluation, and the revised model 47 is then used to build the die 28, such as by using the die machining apparatus 38.

Figure 4:
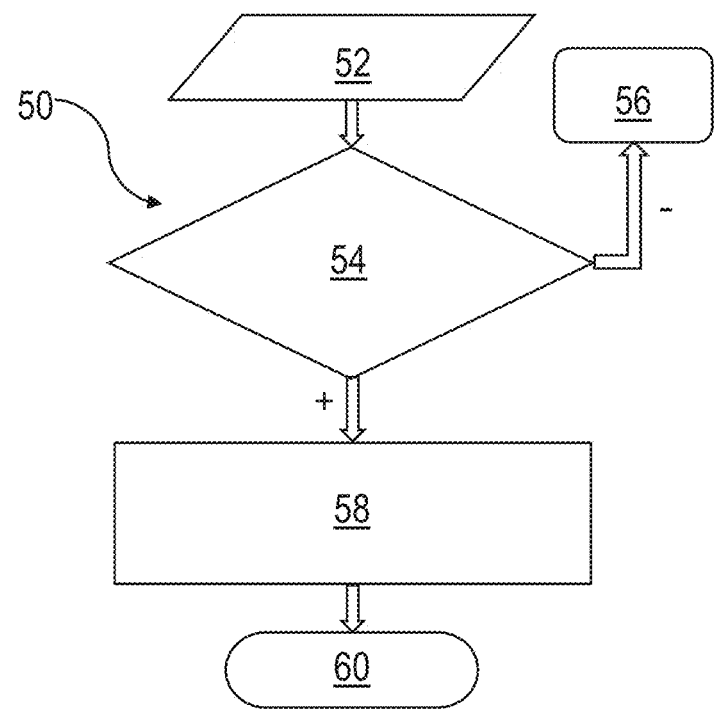
FIG. 4 is a flowchart illustrating a point-facet to node-element mesh data conversion process for use in the stamping development system of FIG. 2, in accordance with exemplary embodiments.

The computing device 40 operates at least one program 46 that includes, or interfaces with, the mesh data creation module 35, the translation module 48 that translates data between node-element format and point-facet format, and the evaluation/simulation module 45. Referring to FIG. 4, a process 50 is illustrated in flowchart form for translating point-facet format data into node-element format data. The point-facet format data file may be created using the mesh data creation module 35, or is read 52 into the program 46 for access by the translation module 48. The data file may be supplied to the computing device 40 via a wired connection, wirelessly, or may be read from a storage device of the computing device 40. The data file describes at least one surface of the part 43 or the die 28 in mesh data form. In some embodiments, the data file is created within the program 46 using the mesh data creation module 35. For example, the program 46 may comprise application software used to evaluate stamping related aspects of dies and or parts. 3-D math data may be used to create the mesh data file, prior to evaluation. Once created, the data file may be saved in memory and read 52 therefrom.

Figure 5:
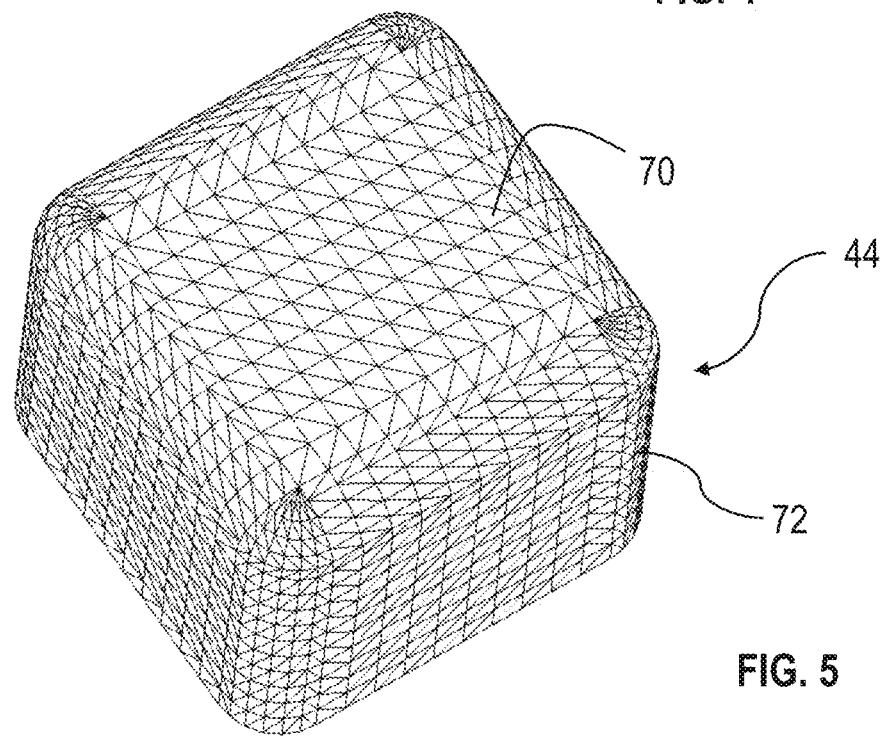
FIG. 5 is a schematic illustration of a die surface portrayed in point-facet format, in accordance with exemplary embodiments.

The data file may be evaluated to determine 54 whether it is in correct point-facet format (i.e. a *.af file). For example, the determination 54 may be made as to whether the data file loads correctly. Sample processing may be carried out to ensure the data file produces expected results. In some embodiments, a visualization 44 of the data file may be displayed on the screen 42 of the computing device 40. FIG. 5 illustrates the visualization 44 of a surface 70 of a punch 72 before the translation as shown point-facet format. The punch 72 may be part of the die 28 for forming the part 43. The visualization may be reviewed to determine 54 whether it properly generates and is complete. When the determination 54 is negative and the data file is determined to not be in the correct point-facet format, the data file is checked 56, such as by reviewing its properties and the data file may be rejected, and a new data file may be read 52.

When the determination 54 is positive and the data file is determined to be in the correct point-facet format, the point-facet data is translated 58 into node-element format data, such as through the translation module 48. The node-element format data is written such as in a *.k file and the process 50 ends 60.

Figure 6:
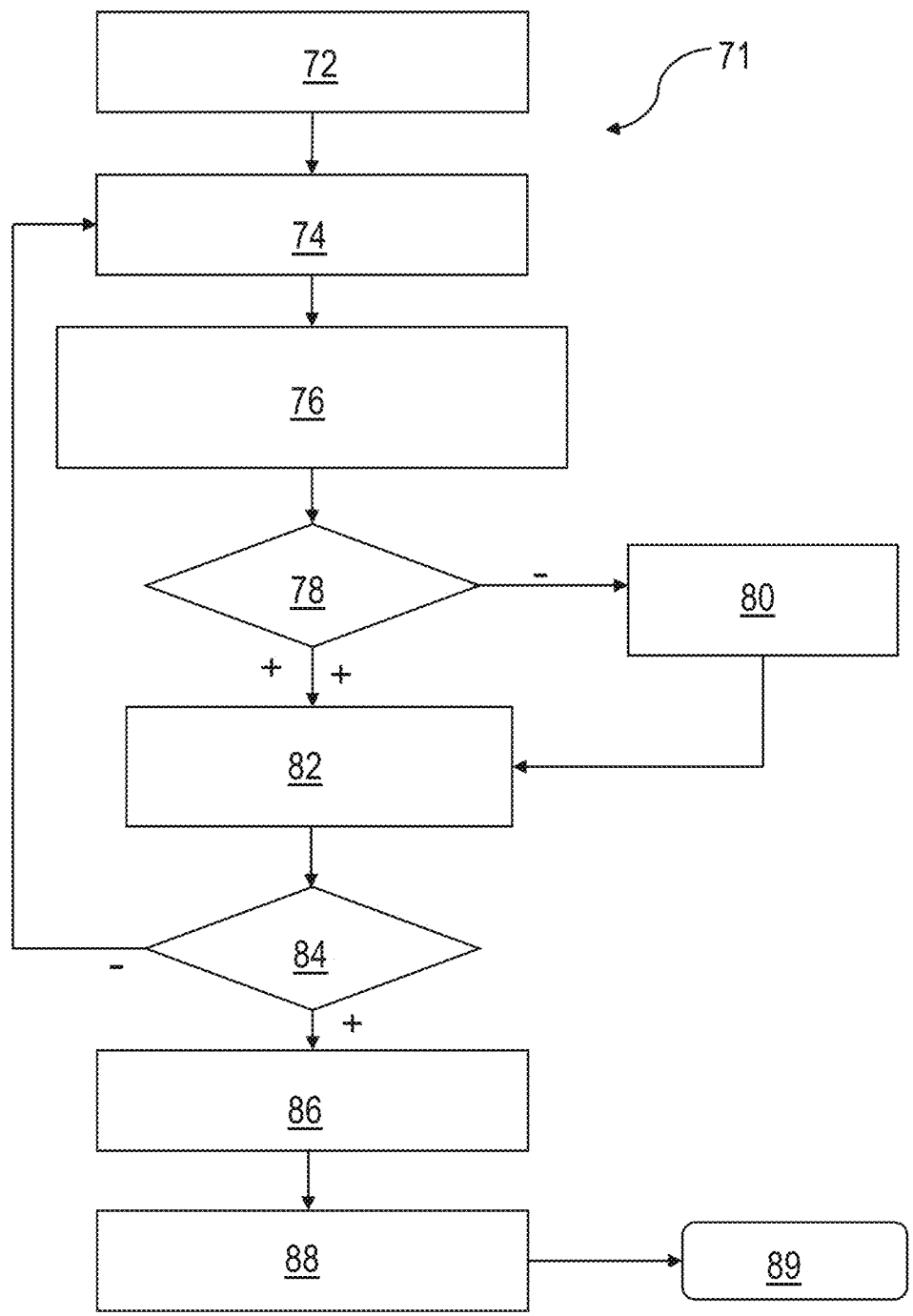
FIG. 6 is a flowchart illustrating details of the mesh data conversion of the stamping die development system, in accordance with exemplary embodiments.

Referring additionally to FIG. 6, the translation 58 is specified in greater detail as process 71. The point-facet data file is recorded 72 in temporary storage within the computing device 40. Within the point-facet data file, the surface 70 is defined by a large number of points and facets. Each $i^{th}$ facet information is read 74 into the translation module 48 from the point-facet data file. Each $i^{th}$ facet is processed 76.

Figure 7:
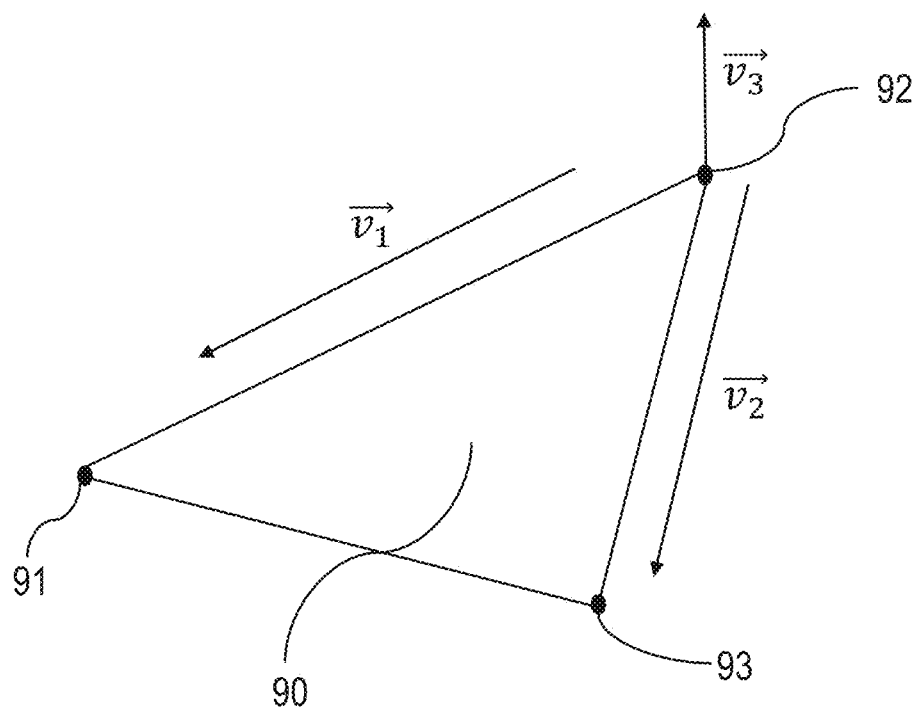
FIG. 7 is a diagram of point-facet to node-element translation, in accordance with exemplary embodiments.

Referring additionally to FIG. 7, a representation of one facet 90 is illustrated. The facet 90 is defined by three points 91-93, with point 92 representing the middle point between points 91 and 93. Through the translate submodule 39, processing 76 of the $i^{th}$ facet includes calculating $\vec{u} = \vec{v}_1 \times \vec{v}_2$, where $\vec{u}$ is the calculated normal vector value of the point 92, $\vec{v}_1$ is the vector value from point 92 to point 91, and $\vec{v}_2$ is the vector value from point 92 to point 93. It should be understood that in other embodiments the facet 90 may include greater than three points, and therefore more than one of these calculations may be carried out for multiple points. Following the calculation, a determination 78 is made of the calculated normal vector value $\vec{u}$ by comparing 78 via ($\vec{u} = \vec{U}$?) that value to ($\vec{U}$), which is the normal of the middle point from the original point-facet data file. When the determination 78 is negative meaning $\vec{u} \neq \vec{U}$, the process proceeds to swap 80 the point numbers of point 91 and point 92. Points 91-93 (with 91 and 92 swapped) are then further processed. In sum, the swap changes the orientation direction of the points to reflect the normal direction given for the facet in the original data file. The process 71 proceeds to write 82 the previous point-facet data in node-element format with the points 91-93 as nodes defining an element in place of the facet 90. When the determination 78 is positive meaning $\vec{u} = \vec{U}$, the points 91-93 in their original orientation are written 82 in node-element format with the points 91-93 as nodes defining an element in place of the facet 90.

The process 71 proceeds to determine 84 whether i>N. This identifies whether all facets in the point-facet data file have been processed, where N the total number of facets in the data file. When the determination 84 is negative and all facets in the data file have not been processed, the process 71 returns to read 74 the next facet's information, which is processed through steps 76-84. When the determination 84 is positive, meaning all facets in the data file have been processed, the process 71 proceeds to clean 86 the node-element data, such as using the cleaning submodule 41. Cleaning improves stability of computations conducted on the file such as during evaluation/simulation. Cleaning 86 for example, includes removing elements according to predetermined criteria, such as those that fall below a threshold (relatively small) size. Cleaning 86 may also include merging nodes that are within a threshold (relatively small) distance of each other. Once the cleaning 86 criteria have been met, the file is written 88 in node-element format and saved or transmitted to a preferred destination, and the process 71 ends 89.

Accordingly, the process 71 results in one set of data originally in point-facet format now existing in both point-facet format and node-element format. The same set of data is now usable in different applications using different file formats. The benefits include the ability to create a mesh data set in one application and use it in multiple applications where file formats are inconsistent. In addition, evaluations/simulations may be carried out in multiple applications and the results may be compared since the same underlying original data set is used.

Figure 8:
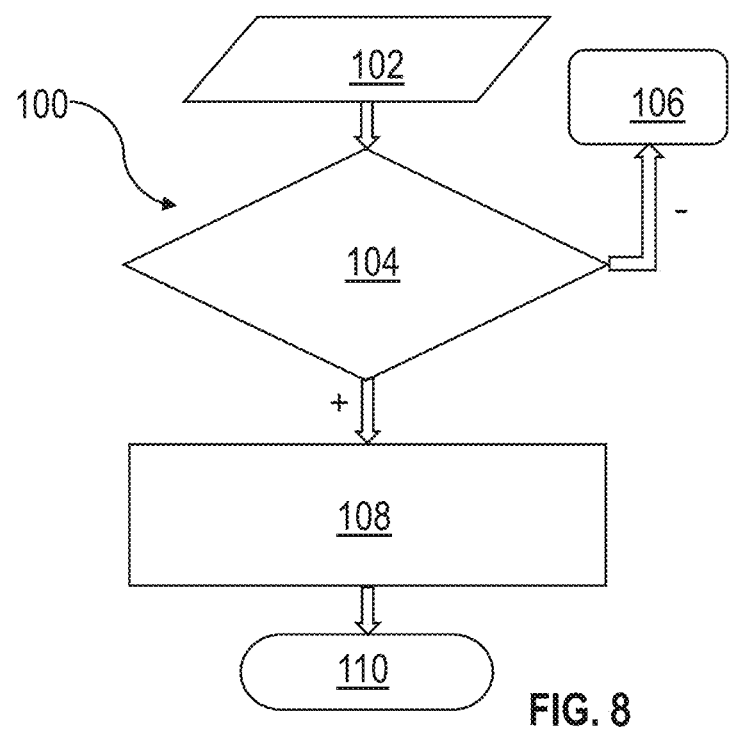
FIG. 8 is a flowchart illustrating a node-element to point-facet mesh data conversion process for use in the stamping development system of FIG. 2, in accordance with exemplary embodiments.

As illustrated in FIG. 8, the reverse translation from node-element format to point-facet format is shown. The node-element format data file is read 102 into the program 46 for access by the translation module 48. The data file may be supplied to the computing device 40 via a wired connection, wirelessly, or may be read from a storage device of the computing device 40. The data file describes at least one surface of the part 43 or the die 28 in mesh data form. In some embodiments, the data file is created within the program 46. For example, the program 46 may comprise application software used to evaluate stamping related aspects of dies and or parts. 3-D math data may be used to create the mesh data file, prior to evaluation. Once created, the data file may be saved in memory and read 102 therefrom.

Figure 9:
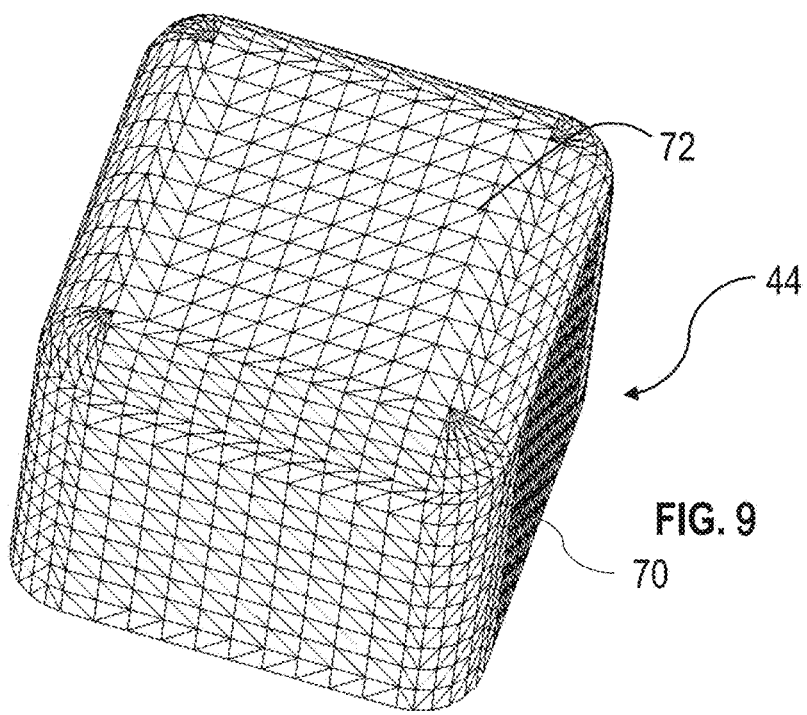
FIG. 9 is a schematic illustration of a die surface portrayed node-element format, in accordance with exemplary embodiments.

The data file may be evaluated to determine 104 whether it is in correct node-element format (i.e. a *.k, *.dyn file). For example, a determination 104 may be made as to whether the data file loads correctly. Sample processing may be carried out to ensure the data file produces expected results. In some embodiments, a visualization 44 of the data file may be displayed on the screen 42 of the computing device 40. FIG. 9 illustrates the visualization 44 of a surface 70 of a punch 72 before translation in node-element format. The punch 72 may be part of the die 28 for forming the part 43. The visualization 44 may be reviewed to determine 104 whether it generates and is complete. When the determination 104 is negative and the data file is determined to not be in the correct node-element format, the data file is checked 106, such as by reviewing its properties and the data file may be rejected, and a new data file may be read 102.

When the determination 104 is positive and the data file is determined to be in the correct node-element format, the node-element data is translated 108 into point-facet format data. In a number of embodiments, prior to conversion, the data file may be checked for quad-element status and may be converted to tri-elements as described in relation to FIG. 10 below. The point-facet format data is written such as a *.af file and the process 100 ends 110. The translation 108 will be similar to the process 71 of FIG. 6, except that at each occurrence, the words node and point are replaced with each other, and at each occurrence, the words element and facet are replaced with each other. As a result, the process 71 converts node-element data to point-facet data and the mesh data file generates in point-facet format as shown in the visualization 44 of FIG. 5.

Figure 10:
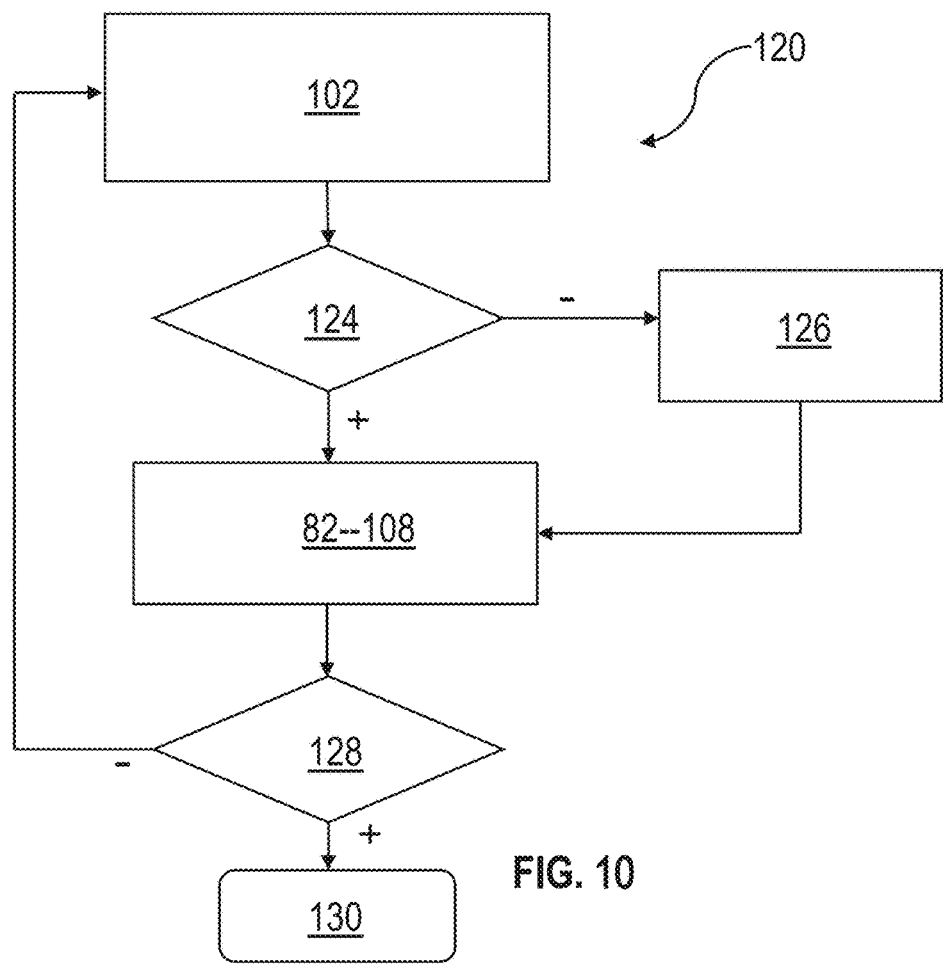
FIG. 10 is a flowchart illustrating conversion of quad-elements to tri-elements as part of the mesh data conversion process of FIG. 8, in accordance with exemplary embodiments.
Figure 11:
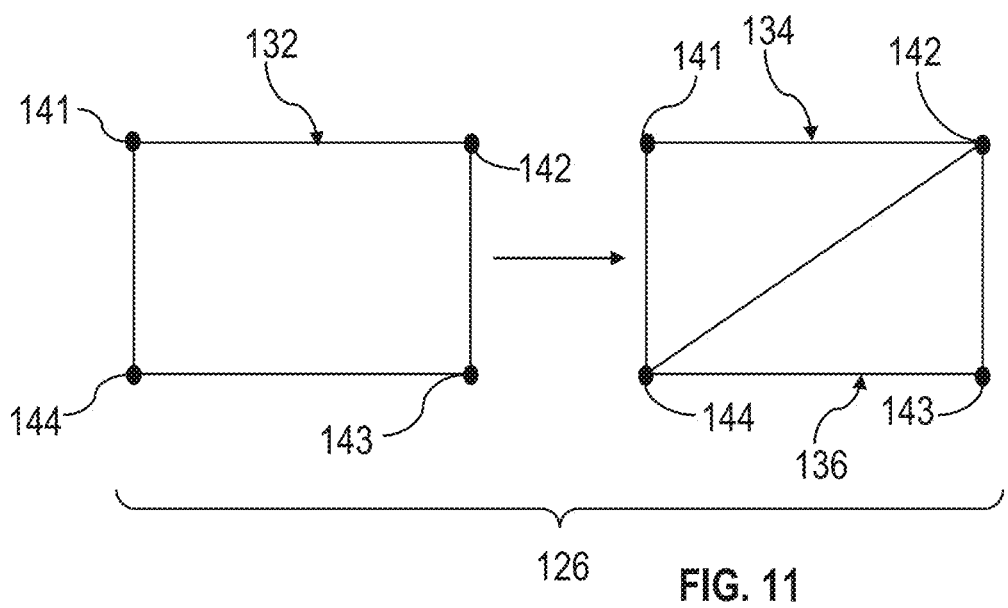
FIG. 11 is a diagram of quad-element to tri-element conversion, in accordance with exemplary embodiments.
Figure 12:
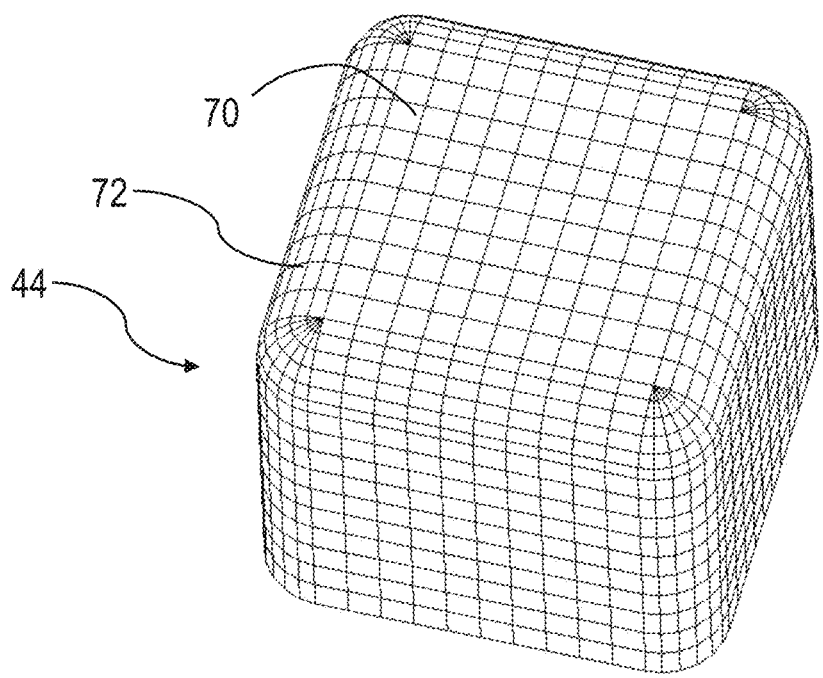
FIG. 12 is a schematic illustration of a die surface portrayed node-element format with mixed quad-elements and tri-elements, in accordance with exemplary embodiments.

Referring additionally to FIG. 10 a process 120, which in a number of embodiments is a part of the process 100, illustrates steps in the identification and conversion of quad-elements. For example, the process 120 may be carried out between steps 104 and 108 after the format is confirmed. In this example a mesh data file originally in node-element format. Assuming the determination 104 of whether the element is in correct node-element format has been made, each $i^{th}$ element is read 102 and further processed for evaluation 124 to determine whether it is a quad-element. Referring additionally to FIG. 11, a quad-element has four nodes 141-144. FIG. 12 illustrates the visualization 44 of the die surface 70 of the punch 72 with quad-elements. Prior to translation 108, when the evaluation 124 is positive and the element is found to be a quad-element 132, the quad-element 132 is split 126 into two tri-elements 134, 136. In this example the tri-element 134 has nodes 141, 142 and 144 and the tri-element 136 has nodes 142, 143 and 144. Splitting 126 may be carried out by the translation module 48, or in a different module or submodule. Having been split 126, the two tri-elements 134, 136 are translated 108 to point-facet format and written in a *.af file. When the evaluation 124 is negative and determines the element is not a quad-element, the process 120 proceeds directly to translation 108. The translated point-facet file will then comprise a mesh data file with tri-facets each having three points. In this example, a determination 128 is made of whether all elements in the original file have been translated. When the determination is negative and additional elements remain for translation, the process 120 returns to step 102 for processing of element i+1. When the determination 128 is positive and all elements have been translated to point-facet format, the punch 72 is meshed in point-facet format as shown in in the visualization 44 of FIG. 5, and the process 120 ends 130.

After converting, the mesh data files are used to evaluate/simulate stamping aspects, and any needed modifications to the data are incorporated in the math data files. The die 28 is then processed through the die machining apparatus 38, fixed in the stamping apparatus 20, and used to fabricate parts 43. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method of producing a die, comprising:
creating, by at least one computer apparatus, a mesh data file representing a surface of the die, wherein the mesh data file is configured in an original format that is one of a point-facet format or a node-element format, where the point-facet format represents the surface by a number of facets, each facet of the number of facets defined by points and is compatible with a first analysis tool, and where the node-element format represents the surface by a number of elements defined by nodes and is compatible with a second analysis tool;
translating, by the at least one computer apparatus, the mesh data file into a translated format that is another of the point-facet format or the node-element format, including processing every facet/element in the mesh data file to convert the mesh data file in the original format into the mesh data file in the translated format, including determining whether all facets/elements in the translated format each have a normal vector equal to an original normal vector for a corresponding facet/element in the original format;
wherein the translating includes:
selecting a first point/node of a selected facet/element of the number of facets/elements;
selecting a second point/node of the selected facet/element;
selecting a third/point node of the selected facet/element
calculating a calculated normal vector for the second point/node by a cross product of a first vector from the second point/node to the first point/node and a second vector from the second point/node to the third point/node;
comparing the calculated normal vector to the original normal vector for the selected facet/element of the mesh data file in the original format
determining whether the first calculated normal vector value at the second point/node equals the original normal vector;
saving, when the calculated normal vector is equal to the original normal vector, the selected facet element in the translated node-element/point-facet format with the selected first, second and third points/nodes in their original orientation;

swapping, when the calculated normal vector is not equal to the original normal vector, the first point/node with the second point/node to change the orientation of the first and second point/nodes to reflect the original normal vector;

saving, when the calculated normal vector is not equal to the original normal vector and with the swapped points/nodes, the facet/element in the translated node-element/point-facet format;

wherein the translating is performed for all facets/elements in the mesh data file to obtain the mesh data file in the translated node-element/point-facet format;

evaluating, by the at least one computer apparatus, the die as represented by the mesh data file in the translated format, prior to building the die to create a corrected mesh data file; and building, by at least one die machining apparatus and using the corrected mesh data file, the die.

2. The method of claim 1, comprising determining whether all facets/elements in the mesh data file have been processed; continuing the translation when all facets in the data file have not been processed, and cleaning, after all facets/elements in the mesh data file have been processed, the mesh data file.

3. The method of claim 1, comprising cleaning, after the translating, the mesh data file by removing certain of the facet/element according to predetermined criteria.

4. The method of claim 3, wherein the predetermined criteria comprise those of the facet/element that fall below a threshold size.

5. The method of claim 1, comprising outputting the mesh data file, after evaluating the die, for building the die.

6. The method of claim 1, wherein the evaluating comprises:

simulating operation of the die, by the at least one computer apparatus running a first software application as the first analysis tool with the mesh data file in point-facet format; and evaluating a surface of the die, by the at least one computer apparatus running a second software application as the second analysis tool with the mesh data file in node-element format.

7. The method of claim 1, wherein the evaluating comprises determining, virtually by the at least one computer apparatus, whether operation of the die as represented by the mesh data file results in malformation of a simulated blank material; correcting the mesh data file by modifying a surface of the die; and building, by at least one die machining apparatus, the die using the corrected mesh data file.

8. A system for producing a die, comprising:

at least one computer apparatus configured to:

create a mesh data file representing a surface of a product wherein the mesh data file is configured in an original format that is one of a point-facet format or a node-element format, where the point-facet format represents the surface by a number of facets, each facet of the number of facets defined by points and is compatible with a first analysis tool, and where the node-element format represents the surface by a number of elements defined by nodes and is compatible with a second analysis tool;

translate the mesh data file into a translated format that is another of the point-facet format or the node-element format, including processing every facet/element in the mesh data file to convert the mesh data file in the original format into the mesh data file in the translated format, including determining whether all facets/elements in the translated format each have a normal vector equal to an original normal vector for a corresponding facet/element in the original format, including to:

select a first point/node of a selected facet/element of the number of facets/elements;

select a second point/node of the selected facet/element;

select a third/point node of the selected facet/element calculate a calculated normal vector for the second point/node by a cross product of a first vector from the second point/node to the first point/node and a second vector from the second point/node to the third point/node;

compare the calculated normal vector to the original normal vector for the selected facet/element of the mesh data file in the original format;

determine whether the first calculated normal vector value at the second point/node equals the original normal vector;

save, when the calculated normal vector is equal to the original normal vector, the selected facet element in the translated node-element/point-facet format with the selected first, second and third points/nodes in their original orientation;

swap, when the calculated normal vector is not equal to the original normal vector, the first point/node with the second point/node to change the orientation of the first and second point/nodes to reflect the original normal vector; and save, when the calculated normal vector is not equal to the original normal vector and with the swapped points/nodes, the facet/element in the translated node-element/point-facet format, wherein the translating is performed for all facets/elements in the mesh data file to obtain the mesh data file in the translated node-element/point-facet format;

evaluate the product as represented by the mesh data file in the translated format, prior to building the product to create a corrected mesh data file; and a die machining apparatus configured to build the die using the corrected mesh data file.

9. The system of claim 8, wherein the at least one computer apparatus is configured to: determine whether all facets/elements in the mesh data file have been processed; continue the translation when all facets in the data file have not been processed, and clean, after all facets/elements in the mesh data file have been processed, the mesh data file.

10. The system of claim 8, wherein the at least one computer apparatus is configured to clean the mesh data file by removing certain of the facet/element according to predetermined criteria.

11. The system of claim 8, wherein the at least one computer apparatus is configured to:

determine whether the mesh data file includes quad-elements;

convert, prior to the translate, each quad-element having four nodes found in the mesh data file into two tri-elements each having three nodes; and conduct the translate on all elements in the mesh data file including the converted tri-elements.

12. The system of claim 10, wherein the at least one computer apparatus is configured to merge points/nodes that are within a threshold distance of each other.

13. The system of claim 8, wherein the product comprises a die for stamping, and the at least one computer apparatus is configured to:
- simulate operation of the die while running a first software application as the first analysis tool with the mesh data file in point-facet format; and
- evaluate a surface of the die while running a second software application as the second analysis tool with the mesh data file in node-element format.

14. A method of producing a die for stamping a blank into part, the method comprising:
- creating, by at least one computer apparatus, a mesh data file representing a surface of the die, wherein the mesh data file is configured in an original format that is one of a point-facet format or a node-element format, where the point-facet format represents the surface by a number of facets, each of the number of facets defined by at least three points and is compatible with a first analysis tool, and where the node-element format represents the surface by a number of nodes defining elements and is compatible with a second analysis tool, so that the mesh data file in the original format is created using a selected meshing tool that is part of one of the first analysis tool and the second analysis tool;
- translating, by the at least one computer apparatus, the mesh data file into a translated format that is another of the point-facet format or the node-element format, wherein the translating includes at least one of converting the mesh data file from the point-facet format to the node-element format and/or converting the mesh data file from the node-element format to the point-facet format, so that the mesh data file in the translated format is compatible with a selected evaluation tool that is another of the first analysis tool and the second analysis tool, and is not the selected meshing tool, wherein the translating includes processing every facet/element in the mesh data file to convert the mesh data file in the original format into the mesh data file in the translated format, including determining whether all facets/elements in the translated format each have a normal vector equal to an original normal vector for corresponding facets/elements in the original format;
- wherein the translating includes:
  - selecting a first point/node of a selected facet/element of the number of facets/elements;
  - selecting a second point/node of the selected facet/element;
  - selecting a third/point node of the selected facet/element
  - calculating a calculated normal vector for the second point/node by a cross product of a first vector from the second point/node to the first point/node and a second vector from the second point/node to the third point/node;
  - comparing the calculated normal vector to the original normal vector for the selected facet/element of the mesh data file in the original format;
  - determining whether the first calculated normal vector value at the second point/node equals the original normal vector;
  - saving, when the calculated normal vector is equal to the original normal vector, the selected facet element in the translated node-element/point-facet format with the selected first, second and third points/nodes in their original orientation;
  - swapping, when the calculated normal vector is not equal to the original normal vector, the first point/node with the second point/node to change the orientation of the first and second point/nodes to reflect the original normal vector;
  - saving, when the calculated normal vector is not equal to the original normal vector and with the swapped points/nodes, the facet/element in the translated node-element/point-facet format;
  - wherein the translating is performed for all facets/elements in the mesh data file to obtain the mesh data file in the translated node-element/point-facet format;
- evaluating, by the at least one computer apparatus using the second analysis tool, the die as represented by the mesh data file in the translated format, prior to building the die; and
- building, by at least one die machining apparatus and after the evaluating using the second analysis tool, the die using the mesh data file.

* * * * *